United States Patent [19]

Ohkubo et al.

[11] Patent Number: 4,815,341
[45] Date of Patent: Mar. 28, 1989

[54] ELECTRONICALLY CONTROLLED AUTOMATIC TRANSMISSION

[75] Inventors: Masahiro Ohkubo, Kadoma; Hirofumi Shiba, Neyagawa; Katsuma Nakamura, Hirakata, all of Japan

[73] Assignee: Kabushiki Kaisha Daikin Seisakusho, Osaka, Japan

[21] Appl. No.: 188,526

[22] Filed: Apr. 29, 1988

[30] Foreign Application Priority Data

May 2, 1987 [JP] Japan ............................. 62-109486

[51] Int. Cl.⁴ .......................................... B60K 41/06
[52] U.S. Cl. .................................. 74/878; 74/866; 74/869
[58] Field of Search ............... 74/878, 866, 869, 526, 74/476

[56] References Cited

U.S. PATENT DOCUMENTS

| 3,473,404 | 10/1969 | Ross | 74/526 X |
| 3,987,686 | 10/1976 | Paplaski | 74/476 |
| 4,351,206 | 9/1982 | Lemieux et al. | 74/866 |
| 4,474,075 | 10/1984 | Kobelt | 74/526 |

FOREIGN PATENT DOCUMENTS

| 8554 | 1/1985 | Japan | 74/866 |
| 234156 | 11/1985 | Japan |  |
| 256653 | 12/1985 | Japan | 74/861 |

Primary Examiner—Leslie A. Braun
Assistant Examiner—Christopher Campbell
Attorney, Agent, or Firm—Armstrong, Nikaido, Marmelstein & Kubovcik

[57] ABSTRACT

An electronic control circuit memorizes shift patterns of a 2-range and an L-range in addition to a shift pattern of a D-range. An operation switch changes a shift pattern of the electronic control circuit to any shift pattern among those of the D-range, 2-range and L-range when a manual shift lever is in a D-range position. A lock mechanism prevents the manual shift lever from entering a 2-range position and an L-range position. A lock mechanism is releasable. A hydraulic circuit is set to a third speed mode when the manual shift lever is in the D-range position, the circuit is set to a second speed mode when it is in the 2-range position, and the circuit is set to a first speed mode when it is in the L-range position, respectively, in case where the shift valves are not working.

14 Claims, 6 Drawing Sheets (A) (B)

(A) (B)

(A) (B)

ELECTRONICALLY CONTROLLED AUTOMATIC TRANSMISSION

BACKGROUND OF THE INVENTION

1. (Industrial Useful Field)

This invention relates to an electronically controlled automatic transmission for a vehicle.

2. (Prior Art)

A conventional automatic transmission for a vehicle has been so constructed that a driving range has been able to be selected to a driver's satisfaction by moving a manual shift lever 101 in a longitudinal direction of vehicle as illustrated by FIG. 15. Namely; P-range has been for a parking, R-range for a reverse, N-range for a neutral, D-range for an automatic speed change in first, second or third speed, 2-range for a second speed, and L-range for an automatic speed change in first or second speed, respectively. P-, R- and L-ranges have been selected by moving the manual shift lever 101 while pushing a push button 102. When a driver has intended to effect an engine brake or not to change a speed range during driving, he has selected 2-range or L-range by moving the manual shift lever 101.

In the above structure, however, it has frequently occured that D-range position or L-range position has been selected by passing an intented range when moving the manual shift lever 101 from L-range position to 2-range position or D-range position. This maloperation has arisen due to facts that the manual shift lever 101 has been moved in a straight line and a stopper of each drive range has been composed of a stopper mechanism provided with a weak pressing force. As a result, a driver has exhausted his nerves to operate the manual shift lever 101 correctly so that a disadvantage of worse operability has been involved in this structure.

The applicant of the present invention has already proposed the hydraulic speed change stage control unit for automatic transmission (Japanese Patent Application No. 62-49066). Such a control unit is so constructed that the driving range is fixed to a third speed for D-range, a second speed for 2-range and a first speed for L-range respectively, as shown by FIG. 8, in an emergency case where a failure occurs in an electronic control circuit 40 consisting of a microcomputer etc. and a power supply is turned off. On the other hand, in case where the electronic circuit 40 functions normally, the control unit is so constructed that a second speed solenoid valve S2 operates to shift the drive range down to the second speed when 2-position is selected during high speed driving at the third speed with D-range selected, and the second speed solenoid valve SL2 is kept operating in the high speed driving to prevent the driving range from being shifted down to the first speed when L-range is selected during driving with 2-range selected. This is because a speed change width between first and second speeds is generally larger than a speed change width between the second and third speeds, and this structure is indispensable for avoiding a breakage due to an excessive engine brake or an engine overrun.

In such a control unit, however, in case where the electronic control circuit 40 functions normally, a pressure oil passing through a passage 57 presses on an area C of a spool 64 of a 1st shift valve 60 before a solenoid valve S2 is energized to cause the pressure oil to press on an area A of a spool 66 of a 2nd shift valve 62, when L-range is selected during driving at third speed with D-range selected. Therefore, such a disadvantage instantaneously occurs that the drive range is changed to the first speed once and then to the second speed. In order to eliminate this disadvantage, a delay circuit must be installed in the passage 57 so that the hydraulic circuit becomes complicated to induce an increase in manufacturing cost.

SUMMARY OF THE INVENTION

(Object of the Invention)

An object of the invention is to provide an electronically controlled automatic transmission which eliminates a maloperation of a manual shift lever to improve an operability by a large margin.

Another object of the invention is to provide an electronically controlled automatic transmission, in which a conventional trouble such as changing to the first speed once and then to the second speed can be avoided even when a manual shift lever is shifted from D-range directly to L-range by operating an operation switch, a special delay circuit is not required to be installed additionally, and a speed change shock can be eliminated.

A further another object of the invention is to provide an electronically controlled automatic transmission, in which speed change between the third, second and first speeds can be done by operating a manual shift lever with a baffle plate removed in the event when a failure arises in an electronic control circuit, and inoperable state does not occur even in an emergency case.

(Structure of Invention)

In order to accomplish the foregoing objects, in an electronically controlled automatic transmission having a manual valve working in connection with a manual shift lever, shift valves operated by solenoid valves which are driven by an electronic control circuit previously memorizing shift patterns, and a hydraulic circuit controlled by these manual valve and shift valves for driving brakes and a clutch in order to change speed; shift patterns of 2-range and L-range in addition to a shift pattern of D-range are memorized previously in said electronic control circuit, an operation switch is provided which changes the shift pattern of said electronic control circuit to any pattern of D-range, 2-range or L-range at time of said manual shift lever being in D-range position, a releasable lock mechanism is provided which prevents said manual shift lever from entering 2-range and L-range positions, and said hydraulic circuit is set to the third speed when said manual shift lever is in D-range position, the circuit is set to the second speed when it is in 2-range position, and the circuit is set to the first speed when it is in L-range position, respectively, in case where said shift valves are not working.

DETAILED DESCRIPTION OF THE INVENTION (Embodiment 1)

Figure 1:
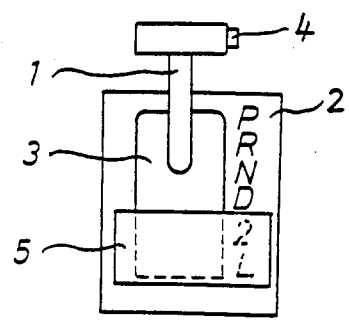
FIG. 1 is a plan view of a manual shift lever for an electronically controlled automatic transmission of an embodiment of the invention.

As illustrated by FIG. 1, a manual shift lever 1 passes and projects through a slotted hole 3 of a selected position indicating plate 2 and a push button 4 is provided on a tip end of the lever. Said slotted hole 3 is covered by a baffle plate 5 at a portion corresponding to a 2-range position and an L-range position, so that the manual shift lever 1 can not be moved to the 2-range position and L-range position. Said baffle plate 5 is removably secured by screws etc. for instance, so that the baffle plate 5 can be detached therefrom to permit the manual shift lever 1 to be moved to the 2-range position or L-range position in such an emergency case as a failure of an electronic control circuit described later.

Figure 2:
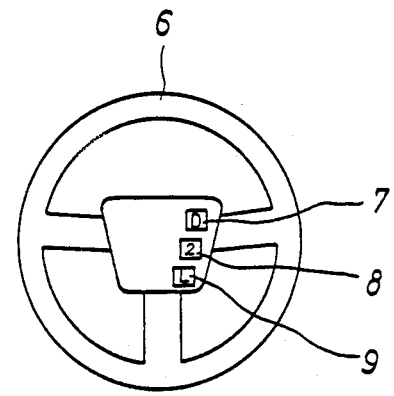
FIG. 2 is a front view of a steering wheel of a vehicle equipped with the same electronically controlled automatic transmission.
Figure 3:
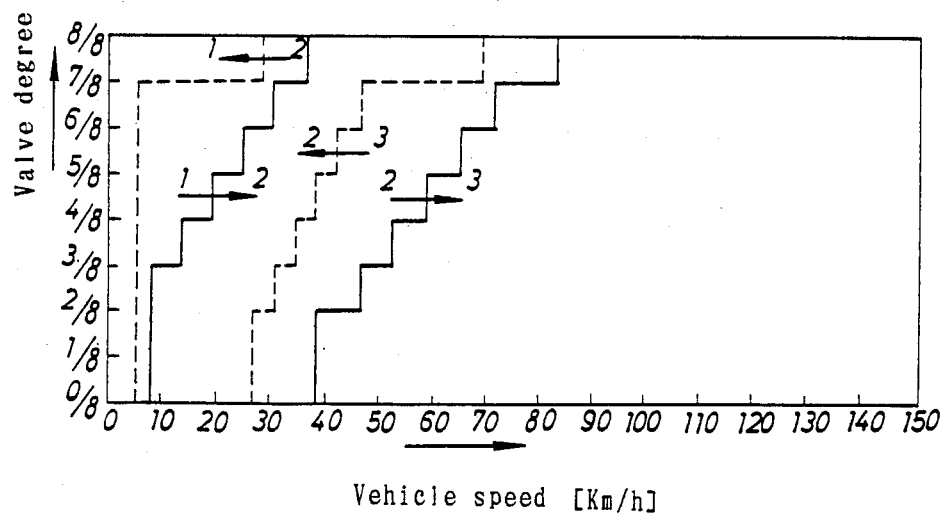
FIG. 3 is an explanatory diagram of a shift pattern of D-range in the same electronically controlled automatic transmission.
Figure 4:
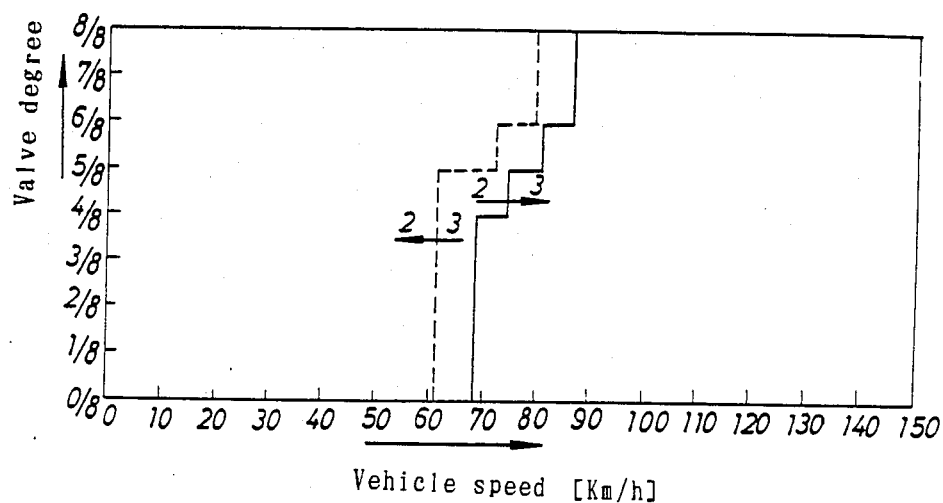
FIG. 4 is an explanatory diagram of a shift pattern of 2-range in the same electronically controlled automatic transmisssion.
Figure 5:
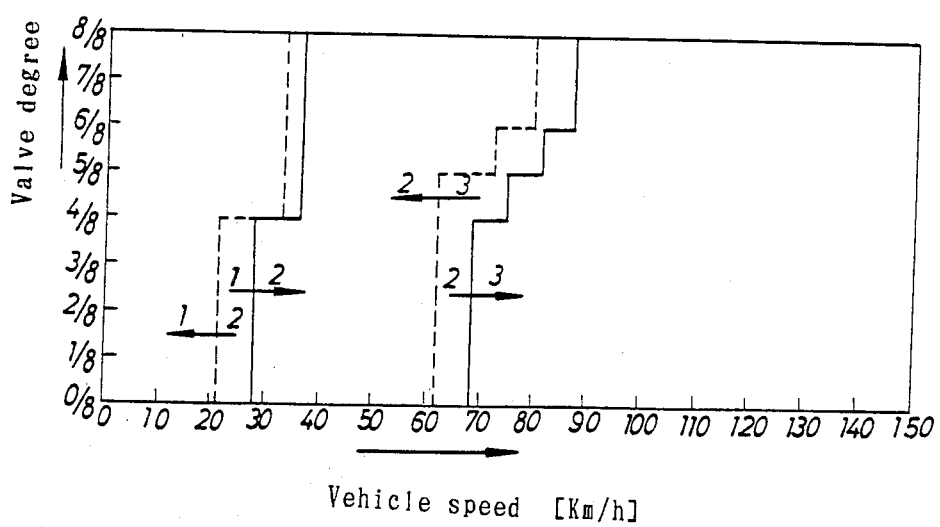
FIG. 5 an explanatory diagram of a shift pattern of L-range in the same electronically controlled automatic transmission.

Operation switches 7, 8 and 9 composed of push button switches are installed on a steering wheel 6 as illustrated by FIG. 2. A 2-range shift pattern as shown by FIG. 4 and an L-range shift pattern as shown by FIG. 5 in addition to a D-range shift pattern as shown by FIG. 3 are memorized previously in the electronic control circuit described later. With said manual shift lever 1 set to the D-range position; operating the operation switch 8 causes the electronic control circuit to control a speed change actuation according to the 2-range shift pattern, operating the operation switch 9 causes the electronic control circuit to control the speed change actuation according to the L-range shift pattern, and operating the operation switch 7 causes the electronic control circuit to return to the control state of the speed change actuation according to the D-range shift pattern.

Figure 6:
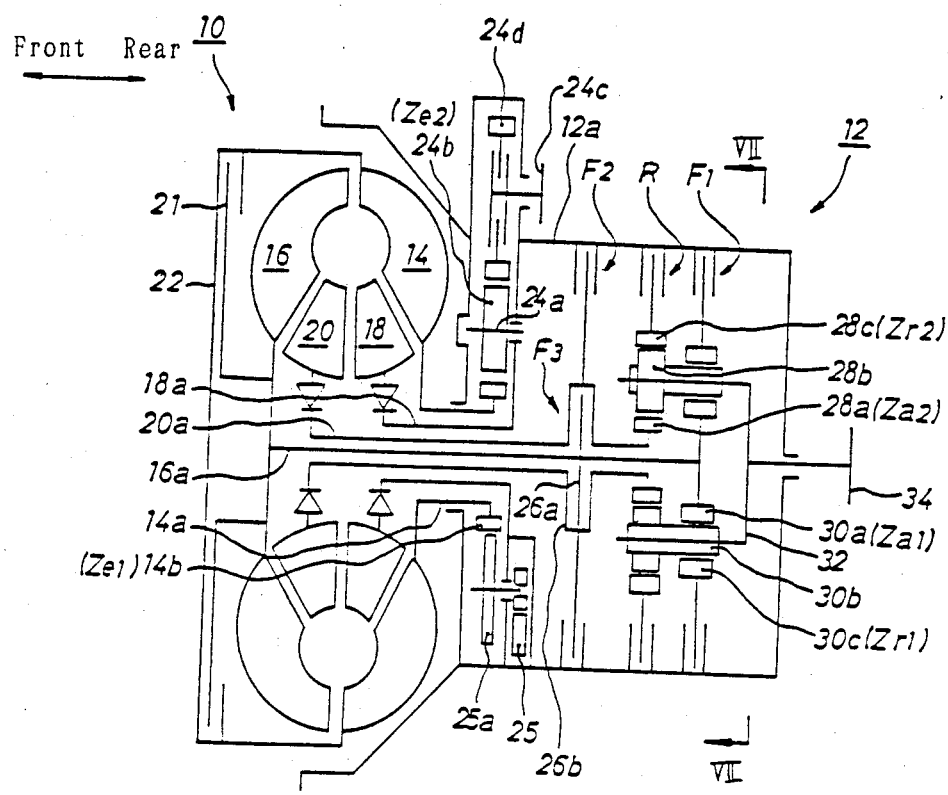
FIG. 6 is a schematic structural diagram of the same electronically controlled automatic transmission.

In FIG. 6, 10 is a four-element two-stage type torque converter. A transmission 12 with forward three-speed and backward one-speed is coupled to a rear stage of the torque converter 10. The transmission 12 has a planetary gear train consisting of a first planetary gear 30b and a second planetary gear 28b which share one planetary carrier 32 in common, and has a clutch F3 and brakes F1, F2 and R.

The automatic transmission is composed of the transmission 12, the torque converter 10 and a hydraulic speed change stage control unit which will be described later in details.

The torque converter 10 consists of a pump 14, a turbine 16, a fixed stator 18, a reversing stator 20 and a lock-up clutch 21; and is adapted to transmit an engine torque from a front cover 22 to the pump 14.

A piston (not shown) is installed freely slidingly between the lock-up clutch 21 and the front cover 22, and this structure provides a so-called pressure piston type torque converter wherein both surfaces of the lock-up clutch 21 form torque transmitting surfaces when the piston 21a is slidden by a hydraulic force toward the lock-up clutch 21.

The turbine 16 is coupled to a turbine shaft 16a and the reversing stator 20 is coupled to a stator shaft 20a. The fixed stator 18 is fixed by a shaft 18a to a housing 12a, and the pump 14 is connected to a pump shaft 14a. A ring gear 14b is provided at a transmission side end of the pump shaft 14a, and a tooth number of the ring gear is set to Ze1.

The ring gear 14b meshes with a gear 24b (tooth number: Ze2) on an intermediate gear shaft 24a disposed at an upper part of the housing 12a, and the gear 24b meshes further with a gear 24d of a PTO (power Take Off) shaft 24c. A charging pump 25 which is a hydraulic source is provided a lower part of the housing 12a, and this charging pump 25 is adapted to be slidden by a sliding gear 25a meshing with said ring gear 14b.

A clutch disc 26a of a clutch F3 for third speed is fixed to a midway of the turbine shaft 16a. A clutch cover 26b of the clutch F3 is connected to the stator shaft 20a. A brake F2 for second speed is disposed at an outside of the clutch cover 26b, and the brake F2 is fixed to the housing 12a.

A second sun gear 28a (tooth number: Za2) is fixed to an end portion of the stator shaft 20d and a first sun gear 30a (tooth number: Za1) is fixed to an end portion of the turbine shaft 16a. The first sun gear 30a meshes with the first planetary gear 30b, and the second sun gear 28a meshes with the second planetary gear 28b.

A first ring gear 30c (tooth number: Zr1) is provided at an outside of the first planetary gear 30b, and the first ring gear 30c meshes with the first planetary gear 30b. The brake F1 for first speed fixed to the housing 12a is disposed at a further outside of the first ring gear 30c.

A second ring gear 28c (tooth number: Zr2) meshes with the second planetary gear 28b at its outside, and the brake R1 for backward drive is disposed at a further outside of the second ring gear 28c. The brake R is fixed to the housing 12a.

Figure 7:
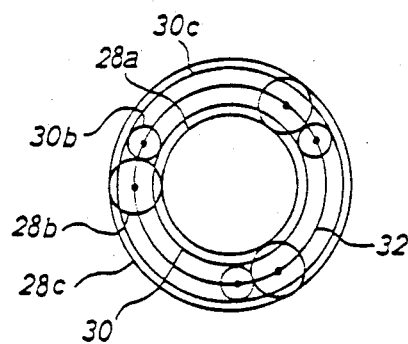
FIG. 7 is a sectional view taken on a line VII—VII of FIG. 6.

The first planetary gear 30b and the second planetary gear 28b are carried on the planetary carrier 32 in such a manner that they can freely mesh each other as illustrated by FIG. 7.

An output shaft 34 is connected to the planetary carrier 32.

The foregoing transmission 12 is able to produce reduction ratios as listed in the following Table by selectively engaging the clutch F3 and the brakes F1, F2 and R. Incidentally O marks in the Table indicate engaged states of the clutch F3 and the brakes F1, F2 and R.

TABLE

| Shifting position | F1 | F2 | F3 | R | Total reduction ratio |
|---|---|---|---|---|---|
| Forward 1st speed | | | | | $\frac{Za1 + Zr1}{Za1} > 2$ |
| 2nd speed | | | | | $2 > \frac{Za1 + Za2}{Za1} > 1$ |
| 3rd speed | | | | | 1 |
| Backward | | | | | $-\frac{Zr2 + Za1}{Za1}$ |

The hydraulic speed change stage control unit will be described hereunder, which controls the clutch F3 and brakes F1, F2 and R by means of the hydraulic force from said charging pump 25 as shown by the Table.

Figure 8:
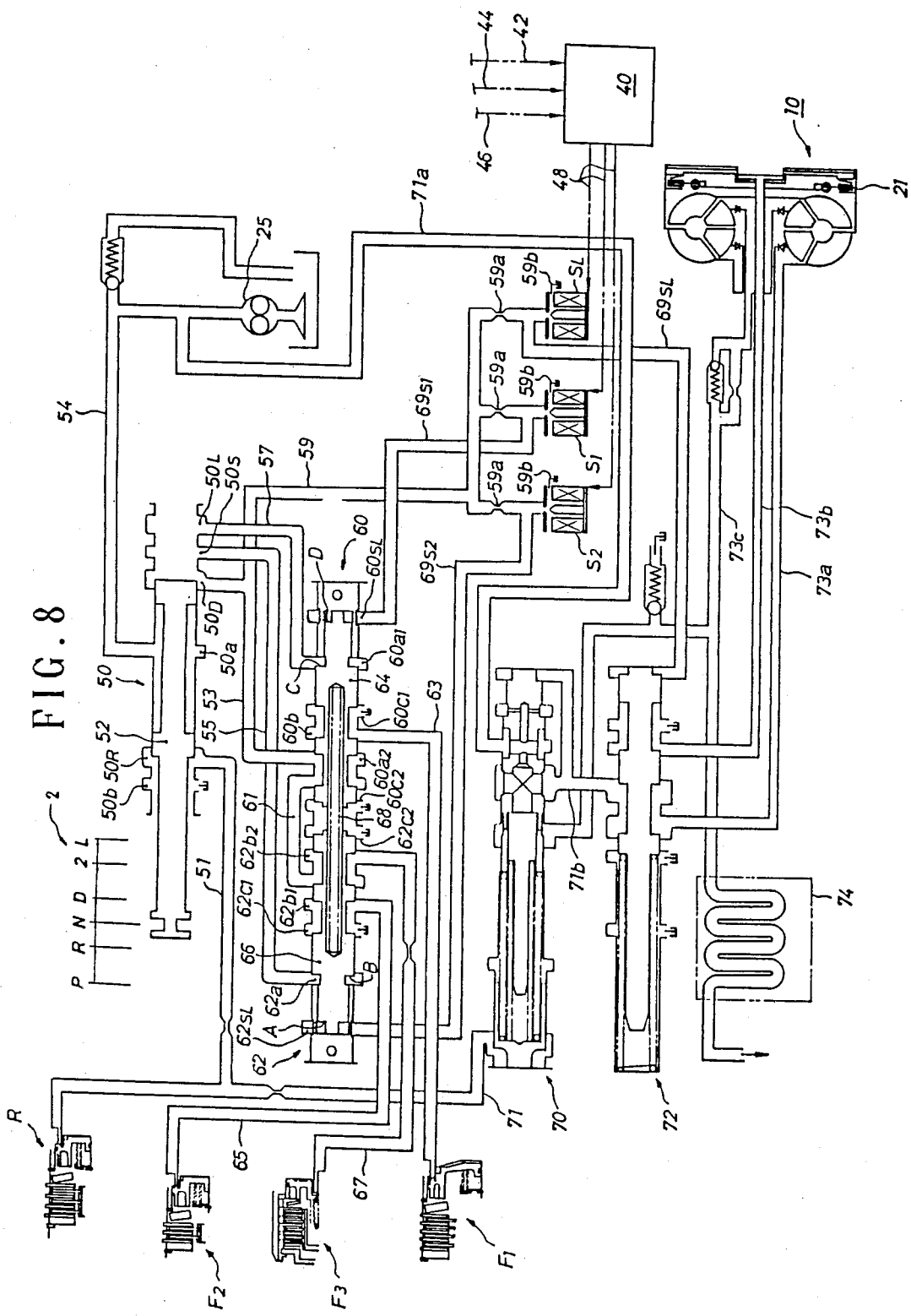
FIG. 8 is a piping system diagram of a hydraulic speed change stage control unit for the same electronically controlled automatic transmission.

In FIG. 8, 2 is the selected position indicating plate for said manual shift lever 1 operated manually by a driver as described above. The P-range of this selected position indicating plate 2 indicates a parking state, the R-range indicates a reversing state, and the N-range indicates a neutral state. This FIG. 8 is the same as FIG. 3 of said Japanese Patent Application No. 62-49066 in its appearance, and only difference between them is that the 2-range and L-range shift patterns in addition to the D-range shift pattern are memorized in the electronic control circuit described later, and arbitral shift pattern can be selected by said operation switches 7, 8 and 9.

The D-range indicates an automatic speed change state between first, second and third speeds by means of an electronic control circuit 40 consisting of a microcomputer etc., the 2-range indicates a state held at the second speed, and the L-range indicates a state held at the first speed. A vehicle speed signal 42, an acceleration pedal opening signal 44, an engine rotation number signal 46 etc. (all being driving state signal) and output signals (not shown) for said operation switches 7, 8 and 9 are entered in the electronic control circuit 40. When the manual shift lever 1 is in the D-range position, the electronic control circuit 40 is deviced as to select a shift pattern specified by the operation switches 7, 8 and 9 from previously memorized plural automatic speed change schedules i.e. from shift patterns according to said signals 42, 44 and 46 etc., and at the same time the control circuit compares that shift pattern with said signals 42, 44 and 46 etc. and decides a speed change state optimum for the driving condition to give an output signal 48.

The output signal 48 is sent to solenoid valves SL, S1 and S2. The solenoid valves SL, S1 and S2 are so deviced as to be switched on only when the output signal 48 is entered in them.. The solenoid valve SL is for the lock-up clutch 21, and the solenoid valves S1 and S2 are for the first speed and second speed respectively.

Said manual shift lever 1 is connected to a spool 52 of a manual valve 50 through a not-shown link mechanism, and a passage 54 for passing a pressure oil from said charging pump 25 is connected to a flow-in port 50a of the manual valve 50. Further, a D-range port 50D, a 2-range port 50S, an L-range port 50L, an R-range port 50R and a drain port 50b, which are wholly opened and closed by a sliding motion of the spool 52, are formed in the manual valve 50.

These ports are disposed at such positions that only the D-range port is opened when the D-range of the spool 52 is selected; both the D-range port 50D and 2-range port 50S are opened when the 2-range is selected; and all the D-range port 50D, 2-range port 50S and L-range port 50L are opened when the L-range is selected.

In FIG. 8, 60 is a first shift valve and 62 is a second shift valve. The both shift valves 60 and 62 are provided in series on the same axis. A single return spring 68 is interposed between a spool 64 of the first shift valve 60 and a spool 66 of the second shift valve, and the both spools 64 and 66 are urged toward both ends by the return spring 68.

Flow-in ports 60a1 and 60a2, a flow-out port 60b, a solenoid port 60SL and drain ports 60c1 and 60c2 are formed in the first shift valve 60. A flow-in port 62a, flow-out ports 62b1 and 62b2, a solenoid port 62SL and drain ports 62c1 and 62c2 are formed in the second shift valve 62. Further, a 1-2 shift valve port 61 for interconnecting the both shift valves 60 and 62 is provided.

Pressure surfaces formed on both spools 64 and 66 are so preset as to satisfy the following relations:

$$A>D, C>D, A>C-B \text{ and } B>D \qquad (1)$$

where A is an area of pressure surface corresponding to the solenoid port 62SL, B is an area of pressure surface corresponding to the flow-in port 62a, C is an area of pressure surface corresponding to the flow-in port 60a1, and D is an area of pressure surface corresponding to the solenoid port 60SL.

In FIG. 8, 70 is a main regulating valve for regulating the hydraulic pressure, and 72 is a lock-up control valve for lock-up purpose.

Piping systems of the foregoing valves will be described hereunder. The R-range port 50R of the manual valve 50 interconnects to the brake R for backward drive through a passage 51, and one end of an auxiliary passage 71 is connected to and branched from a midway of the passage 51. The other end of the auxiliary passage 71 interconnects to a flow-in port of the main regulating valve 70 so as to raise a setting pressure of the main regulating valve 70 by means of a hydraulic force from the auxiliary passage 71 at the time of backward drive.

The D-range port 50D interconnects through a passage 53 to the flow-in port 60a2, the 2-range port 50S interconnects through a passage 55 to the flow-in port 62a, and the L-range port 50L interconnects through a passage 57 to the flow-in port 60a1.

The flow-out port 60b of the first shift valve 60 interconnects through a passage 63 to the brake F1 for first speed, the flow-out port 62b1 of the second shift valve 62 interconnects through a passage 65 to the brake F2 for second speed, and the flow-out port 62b2 interconnects through a passage 67 to the clutch F3 for third speed.

One end of a passage 59 is branched from and connected to a midway of said passage 53, and the other end of the passage 59 is branched into three lines to interconnect to the solenoid valves SL, S1 and S2. Throttles 59a are formed at branch lines of the passage 59, and drain ports 59b are formed in respective solenoid valves.

One end of a passage 69S2 is connected to the solenoid port 62SL of said second shift valve 62, and the other end of the passage 69S2 is branched from and connected to the passage 59 in the vicinity of the solenoid valve S2. Similarly, one end of a passage 69S1 is connected to the solenoid port 60SL of the first valve 60, and the other end of the passage 69S1 is branched from and connected to the passage 59 in the vicinity of the solenoid valve S1. Further, a passage 69SL is provided between the passage 59 in the vicinity of the solenoid valve SL and the lock-up control valve 72.

The pressure oil is supplied from said charging pump 25 through a passage 71a to the main regulating valve 70, and the passage 71a is branched from and connected to the passage 54 in the vicinity of the charging pump 25. Further, a passage 71b is provided between the main regulating valve 70 and the lock-up control valve 72.

Passages 73a and 73b are provided between the lock-up control valve 72 and the torque converter 10, so that the pressure oil is always supplied to an inside of the torque converter 10 from the passage 73a and the pressure oil is supplied to the lock-up clutch 21 from the passage 73b only under the lock-up state.

The pressure oil supplied from the passage 73a to the torque converter 10 is discharged from a passage 73c to an oil cooler 74 after circulating the inside of the torque converter 10, thus being utilized for lubricating an inside of said transmission 12.

(Function of the Invention)

Function will be described hereunder.

In the transmission 12 illustrated in FIG. 6; at the time of the first speed mode wherein only the brake F1 is turned on and the other brakes and clutch are turned off, only the first ring gear 30c is coupled to the housing 12a, the engine torque is transmitted from the pump 14 through a fluid to the turbine 16 and from the turbine shaft 16a to the first sun gear 30a. Then, the torque is transmitted through the first planetary gear 30b to the planetary carrier 32 as a reaction torque caused by the fixed first ring gear 30c, and at the same time from the pump 14 through the fluid to the turbine 16 and the reversing stator 20. The reversed torque transmitted from the stator shaft 20a to the second sun gear 28a is reversed its direction toward the planetary carrier 32 through the second planetary gear 28b and the first planetary gear 30b, thus being decelerated and transmitted thereto. A reduction ratio in this instance can be set to an arbitral value above 2.

At the time of the second speed mode wherein only the brake F2 is turned on and the other brakes and clutch are turned off, only the clutch cover 26b is coupled to the housing 12a to stop the reverse rotation of the stator shaft 20a so that the torque from the torque converter 10 is transmitted from the turbine shaft 16a to the first sun gear 30a. Then, the torque is transmitted through the first planetary gear 30b and the second planetary gear 28b to the planetary carrier 32 as a reaction torque caused by the fixed second sun gear 28a, thus being decelerated and transmitted thereto. A reduction ratio in this instance can be set to any value between 1 and 2.

At the time of the third speed mode wherein only the clutch F3 is turned on, the stator shaft 20a rotates together with the shaft 16a and the sun gears 28a and 30a of the transmission 12 coupled to these shafts rotate integrally therewith, so that the entire planetary gear train developes an integral rotation to set a reduction ratio to 1.

When only the brake R is turned on, the second ring gear 28c is fixed to the housing, and the engine torque is transmitted from the pump 14 through the fluid to the turbine 16 and from the turbine shaft 16a to the first sun gear 30a. Then, the torque is reversed its rotating direction as a reaction torque caused by the fixed second gear 28c, and transmitted through the first planetary gear 30b and the second planetary gear 28b to the planetary carrier 32. And at the same time, the torque is transmitted from the pump 14 through the fluid to the turbine 16 and the reversing stator 20. The reversed torque transmitted from the stator shaft 20a to the second sun gear 28a is decelerated and transmitted to the planetary carrier 32 through the second planetary gear 28b.

As mentioned above, the electronically controlled hydraulic speed change stage control unit functions as follows, which selectively turns on, i.e. supplies the hydraulic force to the clutch F3 and brakes F1, F2 and R.

Firstly, when the manual shift lever 1 is shifted to the N-range position, the manual valve 50 is kept closed so that the pressure oil from the charging pump 25 does not flow from the manual valve 50 to the clutch F3 and brakes F1, F2 and R.

On the other hand, the pressure oil which passes from the passage 71a to the main regulating valve 70 to be pressure regulated there at, is always supplied to the torque converter 10 through the passage 71b, the lock-up control valve 72 and the passage 73a.

Secondly, when the manual shift lever 1 is shifted to the R-range position, the spool 52 of the manual valve 50 moves toward a left side of figure and the flow-in port 50a interconnects to the R-range port 50R. In this state, the pressure oil from the charging pump 25 flows from the passage 54 to the passage 51 and exerts the hydraulic force on the brake R for backward drive to turn on the brake R. Incidentally, in this R-range, the pressure oil is supplied from the passage 71 to the main regulating valve 70 so that a pressure of the main regulating valve 70 is regulated to a higher value to generate a high hydraulic pressure necessary for the backward drive.

Thirdly, when the manual shift lever 1 is shifted to the P-range position, the spool 52 moves further toward the left side. Then, the spool 52 closes the flow-in port 50a and let a parking gear (not-shown) mesh to lock the output shaft 34 (FIG. 6).

Fourthly, when the manual shift lever 1 is shifted to the D-range position, an arbitral shift pattern is selected by the operation switches 7, 8 and 9 from among the plural shift patterns memorized in the electronic control circuit 40, and the speed change stage is automatically selected according to the shift pattern. Incidentally in a state where the operation switches 7, 8 and 9 are not operated after shifting the manual shift lever 1 to the D-range position, the D-range shift pattern is being selected.

In the state the manual shift lever 1 being shifted to the D-range position, the spool 52 of the manual valve 50 moves toward a right side and the flow-in port 50a interconnects to the D-range port 50D. In this state, the pressure oil from the charging pump 25 flows from the passage 54 to the passage 53, and from the flow-in port 60a2 of the first shift valve 60 to the 1-2 shift valve port 61. Then, the oil flows from the flow-out port 62b2 of the second shift valve 62 through the passage 67 to the clutch F3 for third speed, thus turning on this clutch F3. Accordingly, when the output signal 48 is stopped by the electronic control circuit 40, the speed change mode is shifted to the third speed.

Incidentally, the pressure oil from the passage 59 to the solenoid valves S1, S2 and SL is drained from the drain ports 59b when respective solenoid valves S1, S2 and SL are opened.

In case when a vehicle is stopping under the state where the D-range pattern is selected, the vehicle signal 42 becomes zero level to cause the electronic control circuit 40 to determine the drive mode to be ready for start so as to send the output signal 48 to the solenoid valve S1 for first speed. Under this state, the drain port 59b of the solenoid valve S1 is closed so that the pressure oil supplied from the passage 59 flows through the passage 69S1 to the solenoid port 60SL of the first shift valve 60. The spool 64 is moved by the hydraulic force from the solenoid port 60SL against a spring force of the return spring 68 toward the left side of figure, and a right end of the spool 66 strikes against a left end of the spool 64 so that the flow-in port 60a2 of the first shift valve 60 interconnects to the flow-out port 60b of the same.

On the other hand, the 1-2 shift valve port 61 interconnects to the drain port 60c2 so that the pressure oil from the passage 67 is drained from the drain port 60c2. Accordingly, the clutch F3 is turned on and the brake F1 is turned on by hydraulic force from the passage 63, so that the speed change mode is shifted to the first speed.

When the vehicle speed increases to reach the second speed range, the electronic control circuit 40 emerges the output signal 48 only to the solenoid valve S2 for second speed and lets the solenoid valve S1 open. Under this state, the pressure oil from the passage 59 flows through the passage 69S2 to the solenoid port 62SL of the second shift valve 62. The spool 66 is moved toward the right side by the hydraulic force from the solenoid port 62SL against the spring force of the return spring 68 and pushes the spool 64 toward the right side. When the both spools 64 and 66 move integrally toward the right side and a right end of the spool 64 strikes against a right side wall, the 1-2 shift valve port 61 interconnects to the flow-out port 62b1- so that the pressure oil from the passage 53 is supplied through the 1-2 shift valve port 61 and the passage 65 to the brake F2 for second speed.

On the other hand, the flow-out port 60b interconnects to the drain port 60c 1 and the brake F1 is turned off. Thus, the shifting actuation from the first speed to second speed is completed.

When the vehicle speed further increases to reach the third speed range, all the output signals 48 from the electronic control circuit 40 become zero level, thus the foregoing third speed shifting state is brought about.

The above D-range shift pattern will produce no trouble. However, in case where a high driving torque is always to be developed in such a case as climbing a steep slope or in case where the engine brake is to be effected when descending a slope, the operation switch 8 or 9 is operated to select the 2-range or L-range shift pattern and the vehicle is driven on the 2-range or L-range shift pattern. Incidentally, in order to return the state to the D-range shift pattern from the state where the 2-range or L-range shift pattern is selected, only operating the operation switch 7 will do.

Incidentally, in the event when the electronic control circuit 40 fails and the output signals 48 can not be emerged, shifting the manual shift lever 1 to the D-range position causes the speed change mode to be fixed to the third speed. Therefore, such a trouble arises that the second speed and first speed can not be used. In such an emergency case, the speed change mode can be shifted to the second speed or first speed by removing the baffle plate 5 and shifting the manual shift lever 1 to the 2-range position or L-range position.

Under the state when the manual shift lever 1 is shifted to the 2-range position, the sleeve 52 of the manual valve 50 moves further toward the right side so that the flow-in port 50a interconnects to the D-range port 50D and the 2-range port 50S. In this state, the pressure oil is supplied to both the flow-in port 60a2 of the first shift valve 60 and the flow-in port 62a of the second shift valve 62.

The hydraulic pressure from the flow-in port 62a pushes the spool 66 toward the right side to cause the 1-2 shift valve port 61 to interconnect to the flow-out port 62b1. Since the flow-in port 60a2 interconnects to the 1-2 shift valve port 61, the pressure oil from the passage 53 flows through the 1-2 shift valve port 61 to the passage 65 to turn on the brake F2 only.

The areas of pressure surfaces of the spools 64 and 66 are preset to $B > D$ as specified by the foregoing equation (1) in this state, so that the spools 64 and 66 do not move from said speed mode position for maintaining the second speed state in the event when the hydraulic force is exerted from the solenoid port 60SL due to a malfunction of the electronic control circuit 40.

When the driving torque is insufficient even in the second speed mode, the manual shift lever 1 is to be shifted to the L-range position. Under this state, the spool 52 of the manual valve 50 moves toward the rightest side to cause the flow-in port 50a to interconnect to the three ports: the D-range port 50D, the 2-range port 50S and the L-range port 50L. The pressure oil flows in the three passages 53, 55 and 57 to be supplied to the flow-in ports 60a1, 60a2 and 62a.

Consequently, the spool 66 is pushed toward the right side and the spool 64 is pushed toward the left side. However, since the areas of pressure surfaces of the spools 64 and 66 are set to $C > B$ as specified by the equation (1), the spool 64 moves integrally with the spool 66 to the leftest position due to a difference of the pressing forces.

In this first speed mode, the flow-in port 60a2 interconnects to the flow-out port 60b so that the pressure oil flows from the passage 53 to the passage 63 to turn on the brake F1.

As described above, the shifting range of the manual shift lever 1 is restricted by installing the baffle plate 5 and the operation switches 7, 8 and 9 are provided for enabling selection of the shift pattern, so that it is enough in the forward drive to always shift the manual shift lever 1 to the D-range position and the maloperation of the manual shift lever 1 can be avoided to improve the operability by a large margin. Further, since the 2-range and L-range shift patterns in addition to the D-range shift pattern are memorized previously in the electronic control circuit 40, the conventional trouble such as changing to the first speed once and then to the second speed can be avoided even when the manual shift lever is shifted from the D-range directly to the L-range by operating the operation switch 9, the special delay circuit is not required to be installed additionally, and the speed change shock can be eliminated. Moreover, the manual operations between third, second and first speed modes become possible through operation of the manual shift lever 1 by removing the baffle plate 5 in the event when the electronic control circuit 40 fails. Therefore, even in an emergency case, the automatic transmission does not become inoperable.

(Embodiment 2)

Figure 9:
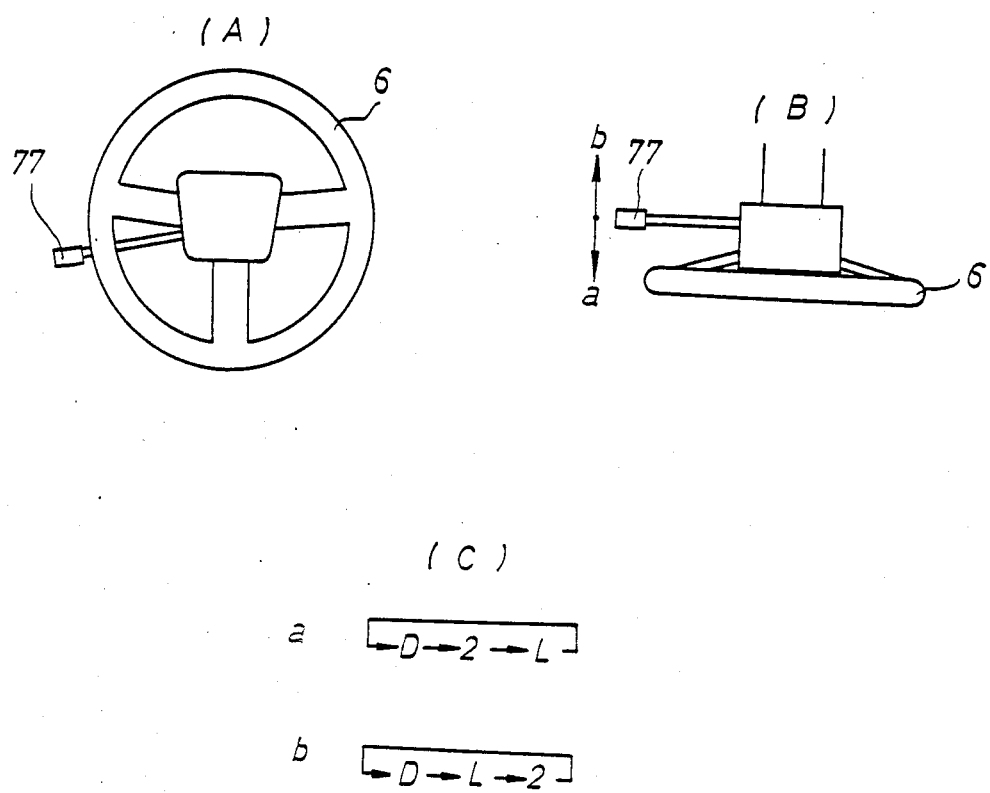
FIG. 9 through FIG. 14 are explanatory drawings of operation switches for electronically controlled automatic transmissions in respective embodiments.

FIG. 9 shows another embodiment, in which a lever type momentary switch is used for an operation switch 77 and this operation switch is attached to the steering wheel 6. As shown by FIG. 9(C), the operation switch 77 changes the shift pattern as a (in order of D, 2 and L) by turns every time the switch is operated in a direction of arrow a of FIG. 9(B), and as b (in order of D, L and 2) by turns every time the switch is operated in a direction of arrow b of FIG. 9(B).

(Embodiment 3)

Figure 10:
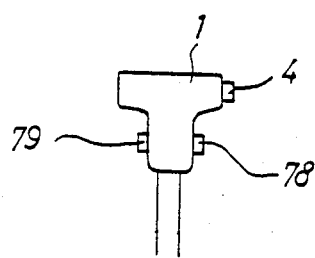

FIG. 10 shows a further embodiment, in which push button type momentary switches are used for operation switches 78 and 79 and these operation switches 78 and 79 are attached to the manual shift lever 1. The shift pattern is changed in order of D, 2 and L by turns as shown by FIG. 9 (C) a every time the operation switch 78 is pushed, nd in order of D, L and 2 by turns as shown by FIG. 9(C) b every time the operation switch 79 is pushed.

(Embodiment 4)

Figure 11:
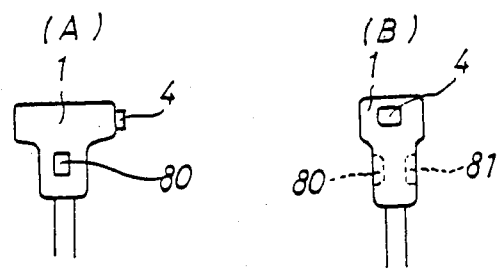

FIG. 11 shows a still further embodiment, in which push button type momentary switches are used for operation switches 80 and 81 and these operation switches 80 and 81 are attached to the manual shift lever 1. A difference from the embodiment of FIG. 10 is that surfaces of the operation switches 80 and 81 are flush with a surface of the manual shift lever 1 so that the operation switches 80 and 81 do not protrude therefrom in contrast with the operation switches 78 and 79 of FIG. 10. Changing operation of shift pattern is the same as the embodiment of FIG. 10. The shift pattern is changed in order of D, 2 and L by turns as shows by FIG. 9(C) a every time the operation switch 80 is pushed, and in order of D, L and 2 by turns as shown by FIG. 9(C) b every time the operation switch 81 is pushed.

(Embodiment 5)

Figure 12:
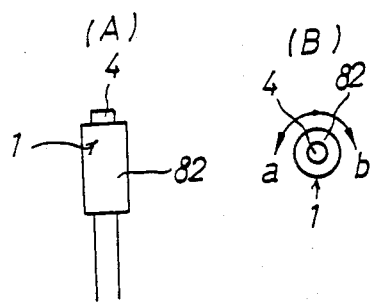

FIG. 12 shows a still further embodiment, in which a knob of the manual shift lever 1 is composed of a rotary type momentary switch which is used for an operation switch 82. Namely, in the manual shift lever 1 of this embodiment, the knob is cylindrical and a push button 4 is installed on top of it. The shift pattern is changed in order of D, 2 and L by turns as shown by FIG. 9(C) a every time the operation switch 82 is operated in a direction of arrow a of FIG. 12(B), and in order of D, L and 2 by turns as shown by FIG. 9(C) b every time the operation switch 82 is operated in a direction of arrow b of FIG. 12(B).

(Embodiment 6)

Figure 13:
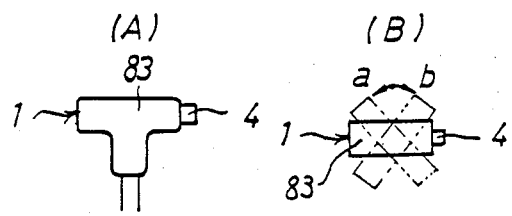

FIG. 13 shows a still further embodiment, in which a knob of the manual shift lever 1 is composed of a rotary type momentary switch which is used for an operation switch 83. Differences from the embodiment of FIG. 12 are that the knob of the manual shift lever 1 is formed into an approximately T-shape and the push button 4 is installed at a side of the knob. Changing operation of shift pattern is the same as the embodiment of FIG. 12. The shift pattern is changed in order of D, 2 and L by turns as shown by FIG. 9(C) a every time the operation switch 83 is operated in a direction of arrow a of FIG. 13(B), and in order of D, L and 2 by turns as shown by FIG. 9(C) b every time the operation switch 83 is operated in a direction of arrow b of FIG. 13(B).

(Embodiment 7)

Figure 14:
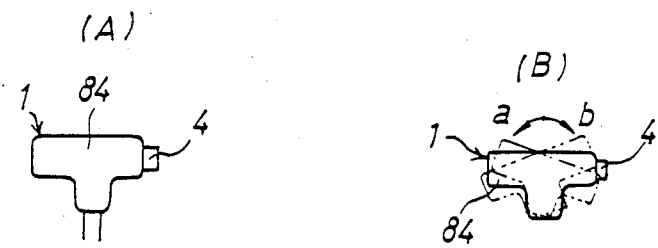
Figure 15:
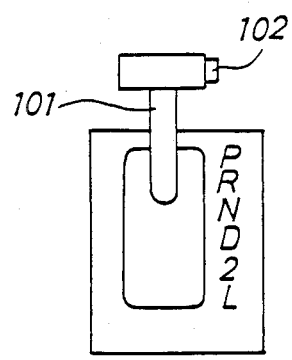
FIG. 15 is a plan view of a manual shift lever for a conventional electronically controlled automatic transmission.

FIG. 14 shows a still further embodiment, in which a knob of the manual shift lever 1 is composed of a rotary type momentary switch which is used for an operation switch 84. A difference from the embodiment of FIG. 13 is that the knob of the manual shift lever 1 is rotated on an axis perpendicular to a lever axis in contrast with the knob of FIG. 13 which is rotated on the lever axis. Changing operation of shift pattern is the same as the embodiment of FIG. 13. The shift pattern is changed in order of D, 2 and L by turns as shown by FIG. 9(C) a every time the operation switch 84 is operated in a direction of arrow a of FIG. 14(B), and in order of D, L and 2 by turns as shown by FIG. 9(C) b every time the operation switch 84 is operated in a direction of arrow b of FIG. 14(B).

(Effect of the invention)

As described above, in this invention, the shifting range of the manual shift lever is restricted by installing the baffle plate and the operation switches are provided for enabling selection of the shift pattern, so that it is enough in the forward drive to always shift the manual shift lever to the D-range position and the maloperation of the manual shift lever can be avoided to improve the operability by a large margin. Further, since the 2-range and L-range shift patterns in addition to the D-range shift pattern are memorized previously in the electronic control circuit, the conventional trouble such as changing to the first speed once and then to the second speed can be avoided even when the manual shift lever is shifted from the D-range directly to the L-range by operating the operation switch, the special delay circuit is not required to be installed additionally, and the speed change shock can be eliminated. Moreover, the manual operations between third, second and first speed modes become possible through operation of the manual shift lever by removing the baffle plate in the event when the electronic control circuit fails. Therefore, even in an emergency case, the automatic transmission does not become inoperable.

What is claimed is:

1. An electronically controlled automatic transmission having a manual valve working in connection with a manual shift lever, shift valves operated by solenoid valves which are driven by an electronic control circuit previously memorizing shift patterns, and a hydraulic circuit controlled by these manual valve and shift valves for driving brakes and a clutch in order to change speed; characterized by that shift patterns of 2-range and L-range in addition to a shift pattern of D-range are memorized previously in said electronic control circuit, an operation switch is provided which changes the shift pattern of said electronic control circuit to any shift pattern among those of D-range, 2-range and L-range at time of said manual shift lever being in a D-range position, a releasable lock mechanism is provided which prevents said manual shift lever from entering 2-range and L-range positions, and said hydraulic circuit is set to a third speed mode when said manual shift lever is in the D-range position, the circuit is set to a second speed mode when it is in the 2-range position, and the circuit is set to a first speed mode when it is in the L-range position, respectively, in case where said shift valves are not working.

2. An electronically controlled automatic transmission as set forth in claim 1, in which the lock mechanism is composed of a removable baffle plate covering the 2-range position and L-range position among shifting range positions of the manual shift lever.

3. An electronically controlled automatic transmission as set forth in claim 1 or claim 2, in which the operation switch is attached to a steering wheel.

4. An electronically controlled automatic transmission as set forth in claim 3, in which a push button switch is used for the operation switch.

5. An electronically controlled automatic transmission as set forth in claim 3, in which a lever type momentary switch is used for the operation switch.

6. An electronically controlled automatic transmission as set forth in claim 1 or claim 2, in which the operation switch is installed on the manual shift lever.

7. An electronically controlled automatic transmission as set forth in claim 6, in which a push button type momentary switch is used for the operation switch.

8. An electronically controlled automatic transmission as set forth in claim 7, in which a surface of the operation switch is flush with a surface of the manual shift lever.

9. An electronically controlled automatic transmission as set forth in claim 6, in which a knob of the manual shift lever is composed of a rotary type momentary switch rotating on an axis of the manual shift lever, and the knob is used for the operation switch.

10. An electronically controlled automatic transmission as set forth in claim 9, in which the knob of the manual shift lever is cylindrical.

11. An electronically controlled automatic transmission as set forth in claim 9, in which the knob of the manual shift lever is formed into an approximately T-shape.

12. An electronically controlled automatic transmission as set forth in claim 6, in which a knob of the manual shift lever is composed of a rotary type momentary switch rotating on an axis perpendicular to an axis of the manual shift lever, and the knob is used for the operation switch.

13. An electronically controlled automatic transmission as set forth in claim 12, in which the knob of the manual shift lever is formed into an approximately T-shape.

14. An electronically controlled automatic transmission as set forth in claim 1 or 2, in which the shift valves are composed of a first shift valve and a second shift valve, spools of the first shift valve and the second shift valve are disposed in series on a same axis, and the spools are urged in opposite directions each other by a return spring disposed between the both spools.

* * * * *